United States Patent
Rathod

(10) Patent No.: US 11,068,139 B2
(45) Date of Patent: **\*Jul. 20, 2021**

(54) COMMUNICATIONS DEVICES AND METHODS FOR SINGLE-MODE AND AUTOMATIC MEDIA CAPTURE

(71) Applicant: ONESNAPS TECHNOLOGY PVT LTD, Mumbai (IN)

(72) Inventor: Yogesh Chunilal Rathod, Mumbai (IN)

(73) Assignee: OneSnaps Technology Pvt Ltd, Mumbai (IN)

(\*) Notice: Subject to any disclaimer, the term of this patent is extended or adjusted under 35 U.S.C. 154(b) by 0 days.

This patent is subject to a terminal disclaimer.

(21) Appl. No.: 16/394,976

(22) Filed: Apr. 25, 2019

(65) Prior Publication Data

US 2019/0250798 A1 Aug. 15, 2019

Related U.S. Application Data

(63) Continuation of application No. 15/426,008, filed on Feb. 6, 2017, now Pat. No. 10,289,287, which is a
(Continued)

(51) Int. Cl.
*G06F 3/0484* (2013.01)
*G06F 16/51* (2019.01)
(Continued)

(52) U.S. Cl.
CPC .......... *G06F 3/04842* (2013.01); *G06F 3/005* (2013.01); *G06F 3/017* (2013.01);
(Continued)

(58) Field of Classification Search
CPC ...... G06F 3/04842; G06F 16/51; G06F 16/60; G06F 3/04845; G06F 3/005; G06F 3/017;
(Continued)

(56) References Cited

U.S. PATENT DOCUMENTS

| 8,428,453 B1 * | 4/2013 | Spiegel | H04N 5/23245 396/299 |
| 2009/0012940 A1 * | 1/2009 | Ives | G06F 16/9535 |

(Continued)

OTHER PUBLICATIONS

Allen Wyatt, Adding Your Own Menu Items, https://word.tips.net/T001051_Adding_Your_Own_Menu_Items.html.
(Continued)

*Primary Examiner* — Tuyetlien T Tran
(74) *Attorney, Agent, or Firm* — Ryan Alley IP

(57) ABSTRACT

Devices are configured to capture and share media based on user touch and other interaction. Functional labels show the user the operation being undertaken for any media captured. For example, functional labels may indicate a group of receivers, type of media, media sending method, media capture or sending delay, media persistence time, discrimination type and threshold for capturing different types of media, etc., all customizable by the user or auto-generated. Media is selectively captured and broadcast to receivers in accordance with the configuration of the functional label. A user may engage the device and activate the functional label through a single haptic engagement, allowing highly-specific media capture and sharing through a single touch or other action, without having to execute several discrete actions for capture, sending, formatting, notifying, deleting, storing, etc. Devices include any number of sensors to properly detect and act in accordance with the user engagement.

2 Claims, 14 Drawing Sheets

Related U.S. Application Data continuation of application No. 14/995,137, filed on Jan. 13, 2016, now abandoned, which is a continuation of application No. PCT/IB2014/059369, filed on Mar. 2, 2014.

(51) Int. Cl.

| | |
|---|---|
| *G06F 16/60* | (2019.01) |
| *H04N 5/232* | (2006.01) |
| *G06F 3/00* | (2006.01) |
| *G06F 3/01* | (2006.01) |
| *G06F 3/03* | (2006.01) |
| *G06F 3/0346* | (2013.01) |
| *G06F 3/0481* | (2013.01) |
| *G06F 3/0482* | (2013.01) |
| *G06F 3/0488* | (2013.01) |
| *G06F 3/16* | (2006.01) |
| *H04L 29/08* | (2006.01) |
| *G11B 27/34* | (2006.01) |

(52) U.S. Cl.
CPC .......... *G06F 3/0304* (2013.01); *G06F 3/0346* (2013.01); *G06F 3/0482* (2013.01); *G06F 3/04817* (2013.01); *G06F 3/04845* (2013.01); *G06F 3/04847* (2013.01); *G06F 3/04883* (2013.01); *G06F 3/16* (2013.01); *G06F 16/51* (2019.01); *G06F 16/60* (2019.01); *H04L 67/06* (2013.01); *H04N 5/23216* (2013.01); *H04N 5/23245* (2013.01); *H04N 5/23293* (2013.01); *H04N 5/232935* (2018.08); *G06F 3/167* (2013.01); *G11B 27/34* (2013.01); *H04L 67/10* (2013.01)

(58) Field of Classification Search
CPC .. G06F 3/0304; G06F 3/0346; G06F 3/04817; G06F 3/0482; G06F 3/04847; G06F 3/04883; G06F 3/16; G06F 3/167; H04L 67/06; H04L 67/10; H04N 5/23245; H04N 5/23293; H04N 5/23216; G11B 27/34

See application file for complete search history.

(56) References Cited

U.S. PATENT DOCUMENTS

| | | | |
|---|---|---|---|
| 2009/0164902 A1* | 6/2009 | Cohen | G10H 1/0058 715/716 |
| 2012/0290968 A1 | 11/2012 | Cecora | |
| 2013/0111366 A1* | 5/2013 | Silbey | A63F 13/795 715/757 |
| 2014/0129953 A1* | 5/2014 | Spiegel | G06F 21/31 715/741 |
| 2016/0050289 A1* | 2/2016 | Cohen | H04L 67/306 709/204 |

OTHER PUBLICATIONS

Creating Your Own Menu, https://www.officetooltips.com/word_2016/tips/creating_your_own_menu.html.

* cited by examiner

Add, Customize, Update, Generate & Create Input Icon(s) or Label(s)

Group Name / Title: ~505
Select Group Name / Title: ~507
Select Group Name As Tag:
[Travel]
[Travel] ~515

Group Photo/Image/Icon: 509
Group Description:
[Capturing travel activities related moments...] 512

520
Add Metadata Order/Rank
Download / Update pre-created or shared or selected or contextual (based on user profile & user data) Groups from server
~517

Main Functions:
☑ Sent To
☐ Publish To
☑ Upload To ~522
☐ Save To
☐ Notify To

Additional Functions:
☑ Save
☑ Add To Album
☑ Sent To Email ~523
☐ Save To Cloud
☑ Add/Present Selected Filters Functions/objects/metrfaces/forms/controls/web services/applications Management
Search, match, browse, view, select, download, subscribe, purchase (make payment), install, un-install, update, upgrade, customize, program, test, attach, detach, sort, group, filter, rank, comments/reviews
525

Types of contacts/connections/users/sources/destinations/web sites/emails/folders: ~527 Edit Mode
☑ Contacts
☑ Groups
☐ Public ~530
☐ Followers
☐ Match making/Interest Specific Type of Contacts/connections/users/sources/destinations/web sites/emails/folders spe. ~532 Edit Mode
☑ Friends Group
☑ Family Group
☑ Relatives Group ~534
☑ Amita
☑ Angilina
☑ Brad 535 Add
537 Update
539 Remove 540 Update from server/source
542 Share
544 Search, invite, imports Order/Rank 545 | Filter 547 | Sort 550 | Group 552

~555
Types: Edit Mode
☐ Activities
☑ Activities (Travel)
☐ Activities (Shopping)
☐ Status Types
☐ Categories ~557
☐ Key Phrases Type specific items & icons:
☑ Going To <Location>
☑ Eating <ask me what foods?> <Form>
☑ Shopping at <Place>
☑ Visiting <Tourist Place Name>
☐ Shopping <What>, <Form/Import/Voice> ~560

Present
565 Add | 567 Update | 569 Remove | 570 Suggested
573 Update from server/source | 575 Share | 577 Schedule to trigger/present/notify
Order/Rank 578 | Filter 580 | Sort 585 | Group 587

Group Item Label / Name / Title / Template / Keywords / Categories / Key phrases etc.
[Going To] ~501
User Mediated Instructions: ~504
[Location] (+) [Forms] (+)
Select tiny Photo/Image/Icon: 506 Save

[Add/update Main Functions] ~502
[Add/update Additional Functions] ~503 ~590
[Sent/share/publish To <contacts/groups/sources/destinations>] ~514

Group Item associate contents:
[I m going to <Say or Type Location>] ~591

Add Metadata 592
(↕) Select 594

Add/Update/Customize Forms (e.g. deals, purchase details etc.) / Filters / Interfaces / controls / wizards / Parameters (Present after capturing photo/video and before executing functions 593

Add suggested, auto match, contextual, preference or settings specific contents fro various sources 595

598

| Q | W | E | R | T | Y | U | I | O | P | Z | X | C |
| A | S | D | F | G | H | J | K | L | V | B | N | M |

T 🎤 📷 🎥 ✏️ 🌐 📍 🔊 ⊕ ~596

Add New | Remove | Share | Settings | Auto Generate | Schedule to trigger / present / notify | Dynamically present based on...

FIG. 5

Main Functions:

- [x] Send, Share To (1 or more users/ groups/contacts/connections/ Networks/Anyone anywhere/public/ followers/friends/family/friends of friends/matched or similar interest users etc.
- [ ] Publish To (e.g. web sites, social networks - Youtube, Facebook - searchable to others etc. - Publish after 1 or set time period))
- [ ] Synchronize At
- [x] Advertised To
- [ ] Like Post To
- [x] Add to Particular Album
- [x] Ask Types of Information about recorded photo/video/voice
- [ ] Ask Types of Questions/Answers
- [ ] Post with user actions including Like, Dislike, Interest to Buy, Suggest, Provide no. of ranks or stars, set as Profile Picture/ Video etc.
- [x] Ask types of comments & reviews
- [x] Ask for user actions or sent types of instructions including Information, comments, Ask Price, features details, weather, enquiry about availability of rooms, Like, Dislike, Interest to Buy, Refer, Provide no. of ranks or stars etc.
- [x] Auto attach types of contents
- [ ] Send via Email, FTP, IM, MMS etc.
- [ ] Upload To
- [ ] Post user's Media/Photo/Video/ Voice Types of Status
- [ ] Post To News Sites
- [ ] Post To Blog Sites
- [ ] Sent Media/Photo/Video/Voice Alerts/Notifications/ Complaints /Feedback/ Suggestions To
- [ ] Sent Media/Photo/Video/Voice Invitations To
- [ ] Sent Media/Photo/Video/Voice Greetings To
- [ ] Post user's Media/Photo/Video/ Voice Types of Presence Info. To
- [ ] Ask for Types of Survey
- [ ] Post products, brands for Sell, presentation or listing at
- [ ] Post to Classified Sites
- [ ] Apply Selected Filters

- [ ] Post Media/Photo/Video/Voice Deals To
- [ ] Add Media/Photo/Video/Voice To (e.g Types of or named life stream, Timeline, story, collaborative story)
- [ ] Media/Photo/Video/Voice related things Order To
- [ ] Deals Available for recorded Photo/ Video/Voice related item(s)?
- [ ] Scheduled Post To
- [ ] Dis-Like Post To
- [ ] Post To contextual (Similar User Status, Location specific, related, matched)
- [ ] Voice/Video Call To
- [ ] Suggest To
- [ ] Live broadcasting of Media/ Photo/Video/Voice To
- [ ] Detect or identify or auto identify or recognize Photo/Video / Voice associate Types of contextual contents
- [ ] Display Types of contents on Photo/Video (e.g. music or portion of songs, trailer, digital book, book abstract, direction & map,
- [ ] Present contextual advertisements To
- [ ] Types of Process or Formatting with Media/Photo/Video/Voice
- [ ] To Do with Media/Photo/Video/ Voice (Save, Convert to Text, Dictionary Meaning, Add to Notes, Add to Calendar, Add to Today's activities , Searching for similar products and services etc.)
- [ ] Sent request(s) for types of user services (e.g. searching for similar products and services
- [ ] Select request from set of requests and broadcast request specific video/ photo/voice
- [ ] Sent To Photo Collection, Photo Stock, Photo Marketplace sites
- [ ] Sent Contents in Photo/Video Form To
- [ ] Post Voice/Video Resumes To
- [ ] Post Voice/Video Matrimonial Profile To
- [ ] Scanned content Types (e.g. cards, notes, documents etc.)

Additional Functions can select with Main functions :

Exemplary Functions collectively used with main functions e.g. post at particular web site with Like and Save Locally

- [ ] Add Music
- [ ] Add Selective User Profile
- [ ] Ask for Reply
- [ ] Present with 1 or more types of chat interface
- [ ] Present with survey forms
- [ ] Present with Questions/ Answers interface
- [ ] Present with user actions (save, screenshot, forward, reply, comment box, like button, rank or rating control, allow collaborative edit tools - e.g. write on photo, add emoticons, animations, stickers, virtual goods or small image etc.)
- [ ] Select Presentation Types for sending or presenting recorded photo/video/voice
- [ ] Select Types of Photo Editing features auto apply to recorded photo/video/voice
- [ ] Add advertisements with shared media/photo/video/voice
- [ ] Add to collaborative Timeline - Present in tabular form (e..g. Family, Friends - Present group(s) of photos/ videos/voice/contents or status related to same or range of date & time (remind when other users shares - remind every half hour or set time period for sharing photo/video/ voice/contents or status)- compare that what I and what others (Friends/ Family) did, doing)
- [ ] Save Locally (e.g. Folder Name, Album Name, Slideshow or presentation Name)
- [ ] Add to Story
- [ ] Add to Collaborative Story
- [ ] Apply Tag, keywords, categories or taxonomies
- [ ] Present interface or forms or wizards and/or ask sender user and/or receiver for input or select Comments/Detlals or Descriptions or subject or Story/Message/Voice Message/Caption/Title/Categopry/ Types/Keywords/Key Phrases/ Taxonomies/Tags/ Say Like or Dislike or rank on Photo/Video/Voice
- [ ] Save to Defined Cloud Storage

FIG. 6

COMMUNICATIONS DEVICES AND METHODS FOR SINGLE-MODE AND AUTOMATIC MEDIA CAPTURE

RELATED APPLICATIONS

This application claims priority under 35 U.S.C. § 120 to, and is a continuation of, co-pending U.S. application Ser. No. 15/426,008, filed Feb. 6, 2017, a continuation of U.S. application Ser. No. 14/995,137, filed Jan. 13, 2016, a continuation of International Application PCT/IB2014/059369, filed Mar. 2, 2014 and designating the US. International Application PCT/IB2014/059369, U.S. application Ser. No. 14/995,137, and U.S. application Ser. No. 15/426,008 are incorporated by reference herein in their entireties.

BACKGROUND

Photo or video sharing applications are commonly used to share media among connected or related users. In these applications, users typically are presented with several options for captured media, including: specify permitted viewers or recipients; identify sources or destinations for sharing; like; save; add to album; bookmark; invite; ask other users to reply, provide a like, or comment; add types or categories to media; select and apply filters; select sending methods like email, mms, web services, and one or more types of communication interfaces; ask photo associate one or more types of information to one or more sources; chat or comment; etc. with regard to captured photos or videos. Users may consume much time, such as by clicking or tapping or touching, in selecting among these options for captured photos or videos.

Existing photo and/or video capturing applications usually include touch-enabled button(s) to capture or record video or a photo or voice. This requires user engagement in selecting the photo or video button, such as by touching or tapping the button each time media is to be captured. Users typically much further engage with controls during capture to control zoom, playback speed, lighting, stop capture, etc.

SUMMARY

Example methods include selecting and sharing media through limited device engagement. For example, when media is displayed on the device, a functional label may be displayed that is associated with a receiver of the media. The functional label initiates capture and broadcast of the media to the receiver, such as through a shared network, including a social network, SMS, email, etc. User may customize the functional label to include any number of groups or contacts and well as specific device actions to be taken in connection with the engagement; the functional labels may also be default or auto-generated. The device engagement may be of a single haptic nature in connection with the functional label, detected by the device through a touch sensor. For example, a haptic engagement may include a discrete, single-tap or single-click, a swipe, gesture, a continuous press-and-hold, device reorientation, device shake, etc. The media may include anything that can be captured by the device, including an image, photograph, video, multimedia, audio-visual media, voice, etc. The type of media captured and/or broadcast to the group under the functional label may be varied based on detected haptic engagement, such as from a photograph to a video and vice versa.

Example embodiments include devices, such as mobile devices like smartphones and wearables, configured to execute example methods via operational software installed in memory and connected to a processor. Example embodiment devices include a media capture device such as a camera, microphone, screen, etc. Example embodiment devices include engagement sensors like a touch sensor, gesture sensor, gyroscope, accelerometer, GPS sensor, proximity sensor, etc. to sense and respond to haptic engagement in example methods. A visual media capture controller may be installed as a discrete module on the device to coordinate and control capture and broadcasting of media of an appropriate type and to appropriate recipients under the functional label.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 5 is an illustration of an example embodiment graphical user interface for defining, creating, configuring, updating, adding, removing, customizing personalizing, and/or generating groups and/or group labels on a single-mode visual media device.

FIG. 6 is an illustration of an example embodiment graphical user interface for selecting one or more types of functions on a single-mode visual media device.

DETAILED DESCRIPTION

Figure 1:
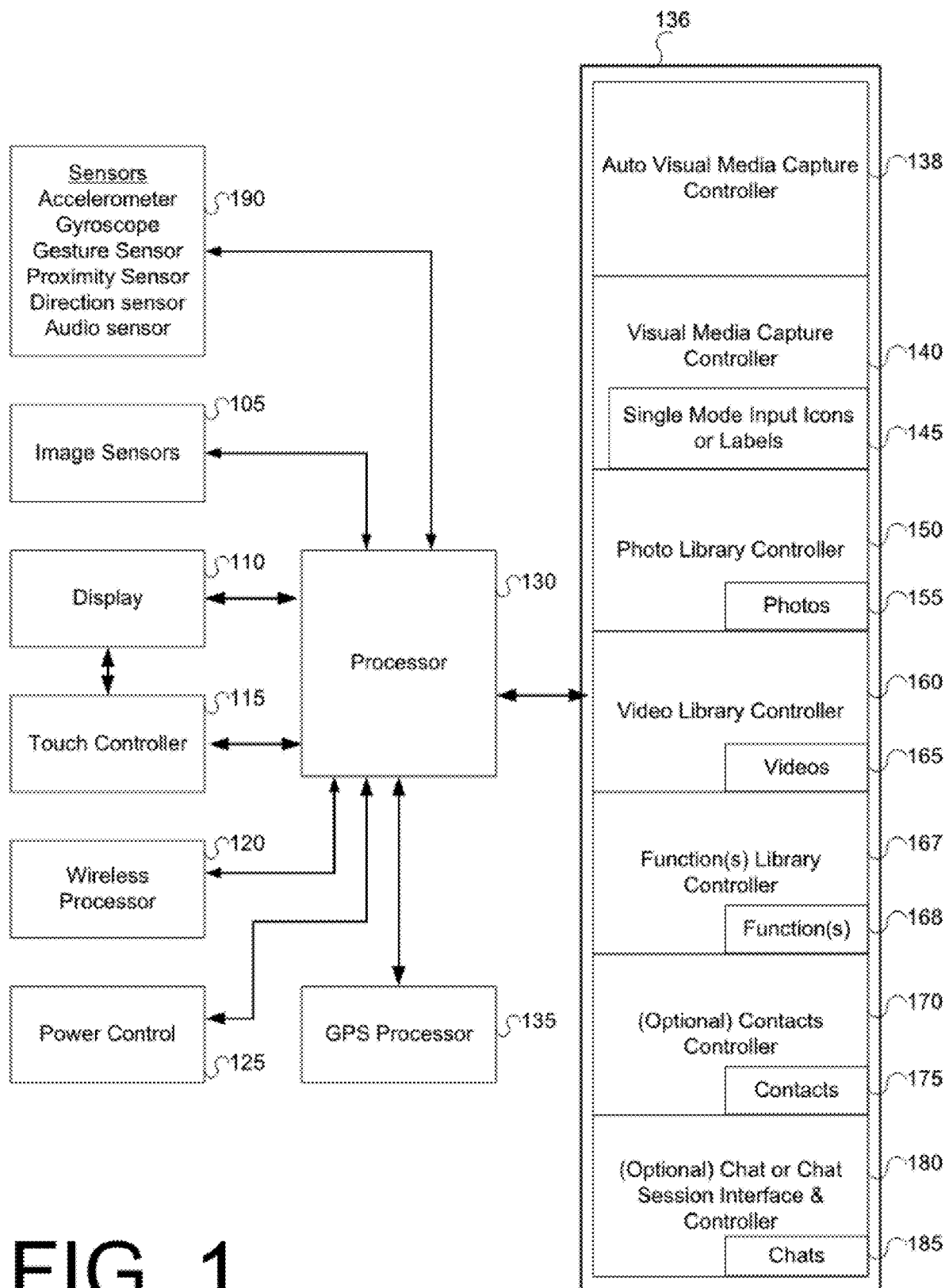
FIG. 1 is an illustration of an example embodiment media device using single-mode visual media capture.

This is a patent document, and general broad rules of construction should be applied when reading it. Everything described and shown in this document is an example of subject matter falling within the scope of the claims, appended below. Any specific structural and functional details disclosed herein are merely for purposes of describing how to make and use example embodiments. Several different embodiments not specifically disclosed herein may fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when element(s) are referred to in relation to one another, such as being "connected," "coupled," "mated," "attached," or "fixed" to another element(s), the relationship can be direct or with other intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Similarly, a term such as "connected" for communications purposes includes all variations of information exchange routes between two devices, including intermediary devices, networks, etc., connected wirelessly or not.

As used herein, the singular forms "a", "an," and "the" are intended to include both the singular and plural forms, unless the language explicitly indicates otherwise with terms like "only a single element." It will be further understood that the terms "comprises," "comprising," "includes," and/or "including," when used herein, specify the presence of stated features, values, steps, operations, elements, and/or components, but do not themselves preclude the presence or addition of one or more other features, values, steps, operations, elements, components, and/or groups thereof.

It should also be noted that the structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations. It should be presumed that any embodiment having features and functionality described below, in any workable combination, falls within the scope of example embodiments.

The inventors have recognized that existing media capturing devices, such as mobile devices, require much time and user interaction to select among several different options for media treatment, including selecting a type of media to be captured, initiating and stopping capture for a desired period of time, applying filters or otherwise editing the captured media, and storing or posting or broadcasting the media with specific labels or recipient parameters. This requires a user to interact, typically via touch, several different times and ways to capture and share media, all while the user may desire to instead focus on selecting and capturing the most desired media. Example embodiments discussed below overcome these and other newly-recognized problems by allowing users to quickly and flexibly capture, record, select, share, post, send, and otherwise present media including videos, audio, voice, sound, images, photos, text and/or conduct one or more associated tasks, allowing the user to be connected, logged-in, always on, and always engaged by allowing a user to automatically capture or record, store, preview, save, and share media in single mode or in a single actuation.

The present invention is computerized devices, software, and/or hardware that capture and handle media based on limited user engagement. The present invention is not—and the inventors and applicant explicitly disclaim—scope over a bare transitory signal or an abstract idea per se. While transitory signals and general concepts of arranging human behavior, comparing information and using rulesets based thereon, and categorizing information are useable with or in the present invention, the present invention is limited to particular implementations of those signals and concepts in connection with or to improve existing media capture and sharing technology. In contrast to the present invention, the few example embodiments and example methods discussed below illustrate just a subset of the variety of different configurations that can be used as and/or in connection with the present invention.

FIG. 1 illustrates an example embodiment electronic device 100 configured to execute example methods of single-mode media capture. Example embodiment device 100 may be, for example, a smart phone or other mobile device and includes processor 130 in communication with memory 136. For example, processor 130 may be a central processing unit and/or graphics processing unit. Memory 136 can be a combination of flash memory and random access memory. Memory 136 is configured to store and permit execution of visual media capture controller(s) 140 and/or auto visual media capture controller(s) 138.

Controllers 138 and/or 148 may interact with several existing media controllers on example device 100. Controllers 128 and/or 148 can be activated from a user touch or tap on an appropriate label or icon, at which point media can be recorded and processed in accordance with example methods. For example, display 110 may present a series of options including an auto-generated, auto-presented, user-created, and/or selected one or more or group or a set of single mode input icons. Visual media controller(s) 140/145 and/or auto visual media capture controller(s) 138 may interact with a photograph library controller 150, which includes executable instructions to store, organize and present photos 155. Visual media controller 140/145 and/or auto visual media capture controller(s) 138 may also interacts with a video library controller 160, which includes executable instructions to store, organize and present videos 165. The visual media controller(s) 140/145 and/or auto visual media capture controller(s) 138 may interact with a functions library controller 167, which includes executable instructions to store, update, organize, and/or execute function(s) 168.

Processor 130 is coupled to image sensors 105 and any other sensors that may be present in example device 100, including an accelerometer, gyroscope, gesture sensor, proximity sensor, direction sensor, and/or audio sensor 190. Image sensors 105/190 may be known digital image sensors that capture visual media, which may be presented on display 110. Using visual media capture controllers 140/145 and/or auto visual media capture controller(s) 138, image sensors 105 may capture visual media and present the visual media on display 110 for user observation and interaction.

Touch controller 115 is connected to the display 110 and the processor 130 so that example embodiment device 100 may be responsive to haptic signals applied to display 110. For example, visual media capture controller 140 and/or auto visual media capture controller(s) 138 may present an auto-generated, user-defined, user-created, user-selected, and/or auto-presented one or more or groups or sets of input icons or labels on display 110. Visual media capture controller 140 can communicate with processor 130 regarding haptic signals applied to the display 110, which may be sensed or recorded by touch controller 115. For example, visual media capture controller 140 is configured to process haptic signals from a user in order to capture or record media in example embodiments.

Auto visual media capture controller(s) 138 is further configured to communicate with processor 130 regarding auto-identified or detected signals from sensors including, for example, an accelerometer, gyroscope, gesture sensor, proximity sensor, direction sensor, and/or audio sensor 190, potentially via display 110. Example embodiment electronic device 100 may include several other components commonly associated with a mobile device or personal computer like a smartphone, tablet computer, wearable computer, global positioning device etc. Such components may include wireless signal processor 120, power control circuit 125, global positioning system processor 135, etc. Known features of example embodiment device 100 may be interfaced with, and interact with, visual media capture controller(s) 140/145.

Figure 2:
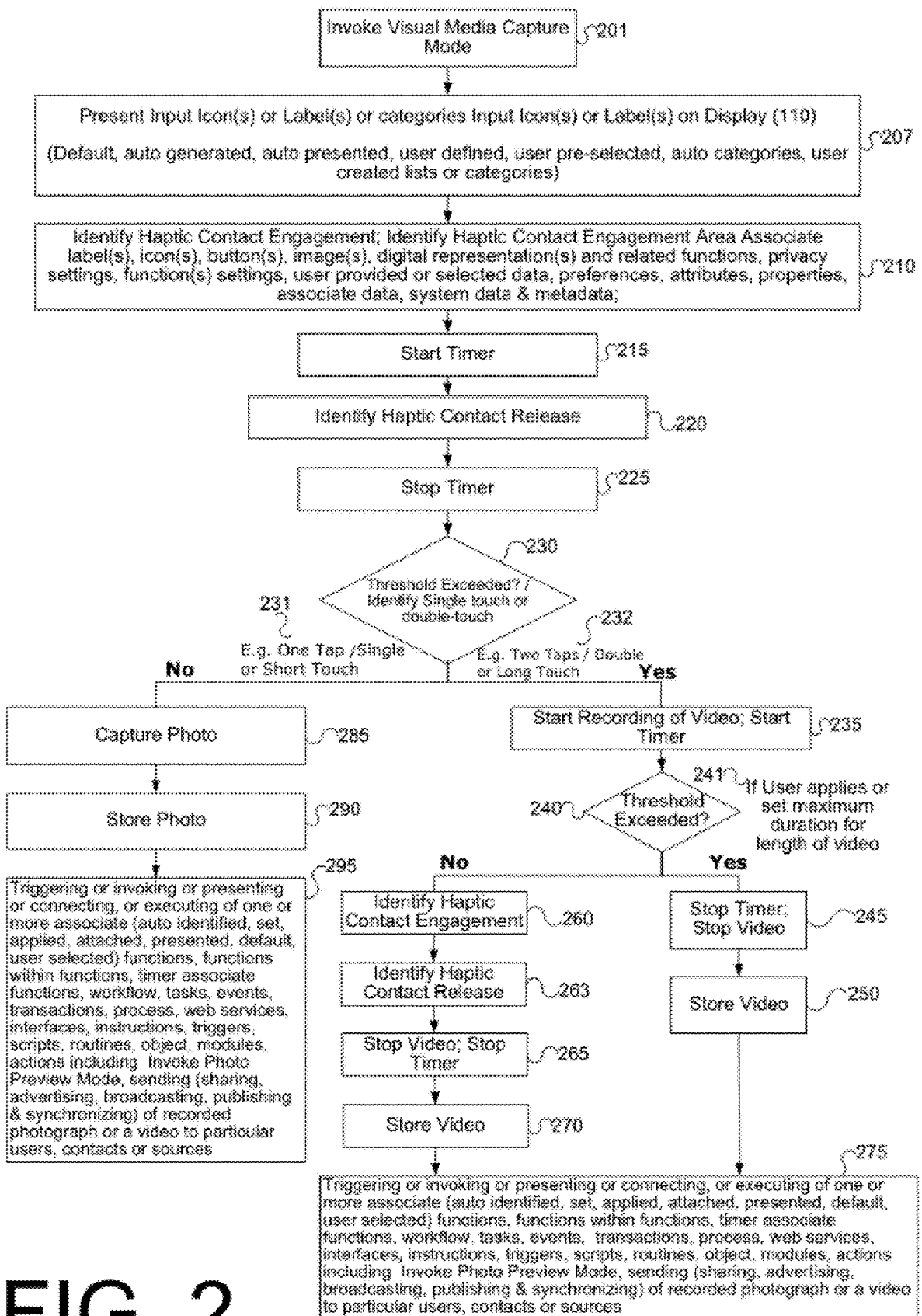
FIG. 2 is a flow chart of an example method of processing operations in a single-mode visual media capture.

FIG. 2 is a flow chart illustrating example methods as well as specific algorithmic operations that a processor may be configured to perform with appropriate programming. For example, visual media controller 140 may be configured to execute the algorithm of FIG. 2 and networked in a configuration shown in example device 100 in FIG. 1 as a specific example of converting an all-purpose processor into visual media controller 140. Visual media capture mode may be invoked in 201.

Figure 3:
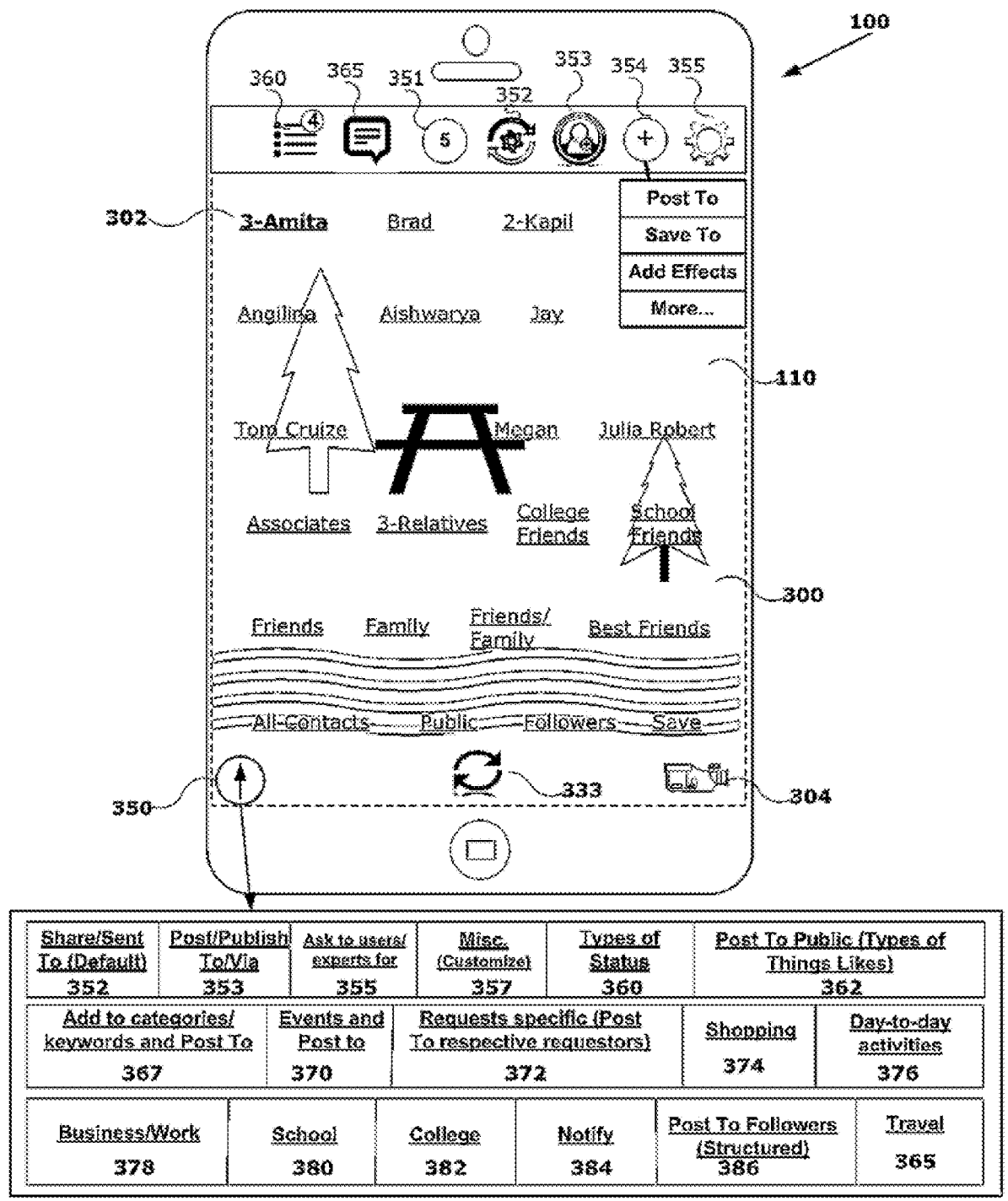
FIG. 3 is an illustration of an example embodiment graphical user interface for presentation on a single-mode visual media capture device.

As an example of invoking in 201 and further actions through 250/270/290, a user may access an application presented on display 110 to invoke a visual media capture mode. FIG. 3 illustrates an example GUI that can be executed on display 110 in an example embodiment electronic device 100 in a visual media capture mode with visual media 300. Display 110 may also present an input icon(s) or label(s) 302 that a user may press to invoke visual media capture mode in 201 in FIG. 2, indicating a photograph or other media will be recorded. For example, if a user intends to take a photograph, then the icon(s) or label(s) 302 may be engaged with a haptic signal. The user may switch to video through continued engagement with the icon(s) or label(s) 302. For example, if the engagement persists for a specified period of time (e.g., 3 seconds), then the output of the visual media capture is determined to be video and starting of recording of a video. The video mode may be indicated on the display 110 with an icon 304. If the user decides to stop the video, the user may further engage the icon(s) or label(s) 302 or an icon 304.

In 207, a user may be presented with Input Icon(s) or Label(s) 302 (FIG. 3) by visual media capture controller 140 on display 110 (FIG. 1). Or, for example, in 207, a user may be presented with categories 350 (FIG. 3) by visual media capture controller 140 (FIG. 1) through which a user can select categories 350 of Input Icon(s) or Label(s) 302 (FIG. 3) via visual media capture controller 140 on display 110 (FIG. 1).

Similarly, in 207, a user can access default Input Icon(s) or Label(s) 302 (FIG. 3) by visual media capture controller 140 (FIG. 1) on display 110. Or a user may be presented with auto-generated Input Icon(s) or Label(s) 302 by visual media capture controller 140 on display 110, based on user's one or more activities, actions, senses, events, transactions, location(s), check-in place(s0, status, updates, presence information, user profile, user data, user connections, and any combination thereof. Still further, in 207, a user can create, search, match, browse, select, add, remove, attach, detach, show, hide, order, sort, rank, filter, page-wise group, any of groups, lists, and category Input Icon(s) or Label(s). Such actions may be fully or semi-automated with auto-selection and/or recommendations. Input Icon(s) or Label(s) 302 (FIG. 3) may include button(s), image(s), photo(s), one or more types of digital representation(s), text including names, named entities, identities, nodes, keywords, key phrases, categories, taxonomies, contacts, connections, and/or commands, for example.

As shown in FIG. 2, haptic contact engagement is identified in 210. For example, the haptic contact engagement may be at icon 302 (FIG. 3) on display 110. The touch controller 115 in response may generate haptic contact engagement signals for processing by visual media capture controller 140 in conjunction with processor 130. Alternately, the haptic contact may be on any other icon or label on display 110. Areas for haptic contact and identification in 210 include label(s), icon(s), button(s), image(s), digital representation(s) and associated functions, including user-provided and -selected data, preferences, attributes, properties, system data, metadata etc.

In 215, a timer is started based on haptic engagement. In 225, the timer is stopped when haptic engagement ceases in 220. In 230, it is determined whether a haptic threshold is exceeded or if a user has engaged in lesser haptic engagement, such as if a user has one-tapped or single-touched or short-touched. If lesser haptic engagement 231 is determined in 230, then a photo may be captured 285 and stored 290. If greater haptic engagement 232 is determined in 230, such as a touch-and-hold, long touch, or double-tap, then video capture is started 235. Under video capture, the timer may be started 235 to time haptic engagement. If the timer reaches a threshold as determined in 240, for example, a set period of time such as 15 seconds, then the timer is stopped in 245 and video capture is stopped in 245. Captured video may be stored in 250. If the threshold is not exceeded in 240, then video may be continued during haptic contact engagement 260 until release 263. Upon determining release short of threshold, video may be stopped 265 and the resulting video stored in 270.

In this way, if a user initially intends to take a photograph by engaging icon(s) or label(s) 302 (FIG. 3) but then decides that the visual media should instead be a video, the user may continue to engage the icon(s) or label(s) 302 or double-touch the icon(s) or label(s) 302 to capture video. For example, if the user does not release a tap after 3 seconds, then visual media capture is determined to be video and video capturing or recording is started in 235. The video mode may be indicated on display 110 with an icon 304. If the user decides to stop the video, the user further engages the icon(s) or label(s) 302 or an icon 304.

In 250 or 270, video may be sent to video library controller 165 (FIG. 1) for handling. Visual media capture controller 140 may include executable instructions to prompt the video library controller to enter a video preview mode. Consequently, a user can conveniently review a recently recorded video. Media capture and recordation, as well as timer functionality, may be executed by processor 130 operating in conjunction with memory 136 (FIG. 1) under the control of the visual media capture controller 140.

A user may set one or more sets, categories, and/or groups of input icons or labels through dynamic, automatic, or semi-automatic searching, matching, selecting, activating, generating, creating, sorting, ordering, ranking, filtering, adding, attaching, detaching, removing, invoking, and/or updating based on user senses or user device associated sensors. Such sensor(s) may include accelerometers, gyroscopes, gesture sensors, proximity sensors, direction sensors like a magnetic compass, audio sensors like a microphone, voice sensor, image sensor, localization (GPS) sensors, biometric or fingerprint sensors, touch screen sensors, and/or many other available sensors. Such actions can also be used to install, uninstall, purchase, make payment, subscribe, add, add or update functions, attach, detach, remove, invoke, activate, execute, upgrade, update and present functions associated with one or more sets, categories, and/or groups of input icons or labels.

As seen in FIG. 3, a user can use single-tap or double-tap to show/hide input all or partial icons or labels 302 from display 110. The user may be notified about availability of input icons or labels associate users, contacts or sources or connections via a change in color of input icons or labels; for example, input icons or labels may turn green when an associate user or contact is available or online. A user may be notified of numbers of shared contents received, sent, pending to view, view by sender, and/or view by receiver from icons or labels with added numbers. For example "3-Amita" input label 302 may indicate that connected user Amita sent 3 shared items or chat messages including videos or photos or voice or text messages to the user.

A user can start a chat or chat session 365 for captured, posted, shared, or presented photos or videos. Similarly, chats or chat session 365 may automatically begin. A user is still able to move to a next or previous icon or label or scroll up or down for viewing and selecting input icons or labels. Users may manually search, view, and/or select one or more contacts or group(s) of contacts from all contact 353 for sharing captured or selected media, including videos, photos, and/or voice or text messages. A user may also set or apply or update period of time (e.g. number of seconds—5 seconds) 351 with one or more input icons or labels 302 for auto-deleting or auto-removing shared or presented media. The user may be able to dynamically update or change, via voice or manual entry, this period of time (e.g. increase to 5 seconds) 351 after sharing of media but before viewing by receiver(s).

In example embodiments, media may be shared in a transient mode. A user can select one or more presented input icons or labels via one-tap with slide on selected or preferred input icon(s) or label(s). Media may also have restricted share permissions, such that only a sender may forward or re-send or save locally the sender's own video, audio, photo, image, voice, contents, chat session associated messages and shared resources. Media may be auto-presented with contextual contents, such as media presented or shared with video, photo, voice, and/or text. Shared or presented media or contextual contents may be restricted after a disconnection or leaving of all participating members. Absent such restrictions, users may be able to view all shared contents and associated information of media, including sender, delivery/receipt/read status, pending, deleted, removed, screenshotted, forwarded, and/or saved 360.

As seen in FIG. 3, users may apply one or more types of settings 355 for sending, sharing, live broadcasting, and/or receiving media or contextual contents from one or more sources. Settings 355 may include default privacy settings for sending, sharing, posting, publishing and/or live-streaming captured or recorded media, including photos, videos, voice & contents to/at/on one or more contacts and/or group(s) of contacts add/or sources and/or destinations. Users may apply privacy settings for a particular duration or period of time (e.g. set number of seconds) for auto-removing or auto-disappearing of shared contents. Settings 355 may be applied through the chat interface is present after capturing of video or photo, or a user can manually select chat interface via icon 365 (FIG. 4).

In example embodiments, a user can dynamically change position, order, arrange, and/or move one or more input icons or labels on display 110 via touch, slide, and/or drag-and-drop anywhere on display 110. Users can dynamically select functions from a list of functions to add, attach, use, apply, and/or set selected functions with one or more input icons or labels. For example, input icon or label 302 is associated with the function "Sent captured video or photo to user Amita." If the user wants to add more functions with label 302, then user can select function(s) via icon 354 and add, remove, or update selected function(s) and associated parameters, settings, preferences, user inputs or selection, data & metadata with one or more input icons or labels presented on display 110.

Figure 4:
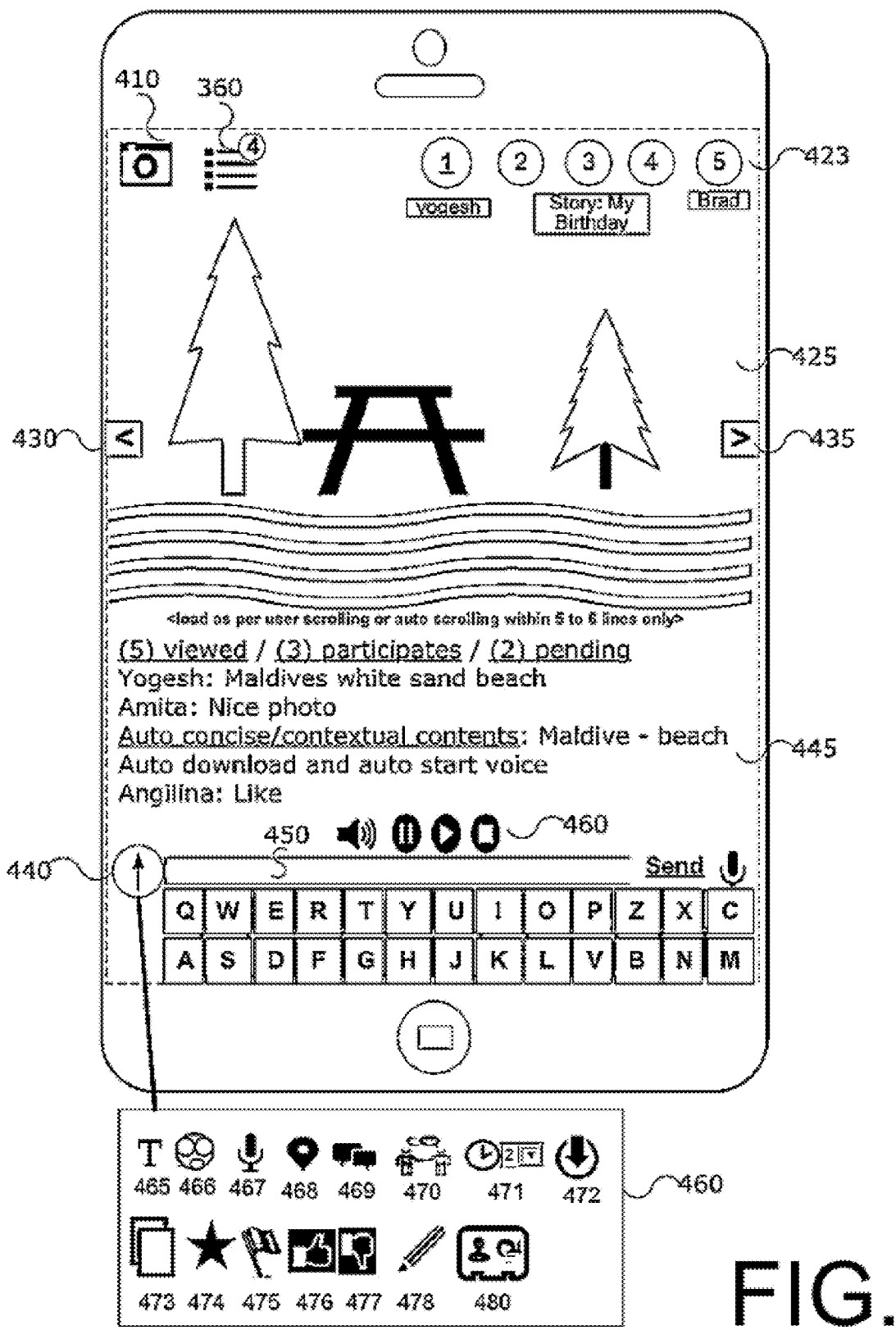
FIG. 4 is an illustration of an example embodiment graphical user interface for presenting chat options on a single-mode visual media device.

As seen in FIG. 4, a user may be presented with chat interface 445 for starting chat session 445 with senders and/or receivers on shared content or media 425, including video, audio, images, text, voice, photos, and any combination thereof. Users can view 425 and chat 445 with other users to whom user sent or shared media or contents 425. Users can select or switch between multiple chat sessions 423 for chatting with one or more users, each on a respective sent or received shared contents 425. Various options 440/460 may be available to the user, including send text messages 450/465, share emoticons 466, send voice message(s) 467, share location information 468, add said captured or shared media to user's one or more selected stories 469, and/or apply privacy settings for who can view the user's one or more stories, including a set period of time or duration for expiration (e.g. 24 hours), a duration or period of time (e.g. number of seconds) for auto-removing shared contents and/or chat conversations from receiver(s) device, application, server(s), database(s), and/or storage medium 471. Options 440/460 may further include saving captured, recorded, or previewed media locally 472, add media to album 473, rank 474, report 475, like 476, dislike 477 shared media or contents 425, edit shared media or contents 478, and/or forward user's own or other user's allowed contents to one or more elected users or group(s) of users 480. A user can view one or more shared contents or media 425 of one or more users via previous icon 430 and next icons 435, as well as switch between users or stories via icons 423. A user may return to a visual media capture controller via icon 410.

A color change or update of number icon(s) 423 may reflect a change in one or more types of status, such as updates in location or check-in place information, updates in availability status, chat participants availability or participation of one or more users with one or more chat sessions, receiving of new messages or voice messages, receiving ratings, like or dislike or comment with shared contents or media, receiving of new captured or recorded shared media by other users, and/or expiration of period of time associated with received shared media or contents from other users.

Users can capture or record media including photo, video, and/or voice for sharing with receivers or participants of chat within a same screen. When the user selects captured and/or shared mode via icon 410, then the chat interface may be hidden and a visual media capture controller with other options as discuss in FIG. 3 may be presented. When the user touches or clicks on icon 365, then the visual media capture controller and associated options may be hidden, and the chat interface and other associated options may be presented as in FIG. 4.

As shown in FIG. 4, a user can play, pause, and/or stop video, audio, or voice 460. The user can view shared as well as received shared contents in a slide show mode and can play, pause, stop media including video, audio & voice 460. For example, FIG. 3 shows auto-generated and user-defined or customized labels presented to the user on display 110 based on the user's smart phone or mobile contacts with auto-associated or user defined associated function(s) (e.g. "Sent Function") with each generated, created, or updated and presented label name associated with a contact, so when the user touches or single- or double-taps on the label or label active area the photo or video is captured or recorded and stored. The captured media may be sent or shared to the label associated with the contact person or group(s) of contacts associated with the label.

FIG. 5 is an illustration of an example embodiment graphical user interface enabling a user to add, update, customize, generate and/or create one or more input icons or labels or one or more group(s) input icons or labels. The user can input 505 a group name or the user can select group(s) name(s) from existing list group(s) 507 for updating said selected group(s) or the user can use selected group(s) 507 as a tag or template for newly created group(s) 505. The user can add or update icon 509 for newly-created 505 or selected groups 507. The User can also add description 512 and/or metadata 515 with newly created group 505 or update description of selected group 507. The user may further provide rank & order to one or more group(s) 517. The user can also download or update pre-created or shared or selected or contextual (based on user profile & user data) groups from server 520. The user can select default function(s), including one or more main functions 522, additional functions 523 for all created, selected, and generated input icons or labels, or the user can select, update, attach, and/or apply one or more main functions 502 and/or additional functions 503 for particular specific or individual created or selected input icon(s) or label(s) 501.

The user may also be provided with functions, objects, interfaces, forms, controls, web services, and/or application management functions including search, match, browse, view, select, download, subscribe, purchase (make payment), install, un-install, update, upgrade, customize, program, test, attach, detach, sort, group, filter, rank, provide ratings and comments/reviews for functions, objects, interfaces, forms, controls, web services, and/or applications 525. The user may select each function-associated parameters including one or more default selected contacts and/or group(s) of contact(s) 534 for created group 505, or the user can select one or more contacts/group(s) of contacts 514 for label 501 of created group 505 or selected group 507. The user can select sources or destinations 530/514 for a particular created group 505 or selected group 507 or for a particular label 501 of particular created group 505 or selected group 507, including web sites names, email addresses, instant messenger credentials, cloud storage address, etc. and provide associated login, authentication, authorization, user identity, password, metadata, and other settings.

Users can manage contacts 534 and/or sources 530 or destinations including add new 535, update selected 537, remove selected 539, update from server(s) and source(s) 540, share 542, search, find, invite and import 544, search who can add users into their contacts 534, order & rank 545, filter 547, sort 550, and/or group 552 user contacts, connections, group(s) of contacts, and sources and destinations, including web sites, web pages, servers, networks, devices, databases, applications, services, cloud storage, email addresses, instant messenger credentials, users of social networks, folder name(s), directories, groups, interfaces, social networks, search engines, peer to peer networks. Users can add new 565, update existing 657, remove 569, suggest 570, updates from server(s) & source(s) 573, share 575, order & rank 578, filter 580, sort 585, group 587, and/or select pre-created categories or types 557 of input icons or labels and associate input icons or labels 560. In another embodiment, users can set presentation settings for dynamically presenting selected types of input icons or labels and associated input icons or labels on display 110, including those dynamically present based on, for example, a particular date & time, ranges of date & time, location, check-in place, activities, actions, interactions, events, transactions, user profile and user data, and/or connected users and data. Of the forgoing, the user may add new 501 via button 565 or update existing selected 560 via button 567 input icon(s) or label(s) and customize or define. For example, the user may provide a name or label 501, icon, add user-mediated actions including one or more forms, types of information, structured fields, forms, interface(s), or application 504, add, or update one or more selected function(s) 502, additional functions 503, and/or apply, set, define, customize one or more types of function(s)-associated parameters. For example, the user may provide sources & destinations including contacts, web sites, web pages, communication channels, servers, networks, application, services, databases, and/or devices for sharing, sending, posting, submitting, presenting, publishing, synchronizing captured, media or contents including video, audio, image, photo & voice 514.

The user can save input icon or label 506. The user can add to input icon or label 501/560 specific contents 591 via various option 594 including select, add, edit, update any media including voice or audio or sound, photo or image, video, emoticons, photo or video effects or filters, location information, selected or searched contents, files or documents and metadata 592. The user can also add suggested, auto match, contextual, preference, or setting-specific contents from various sources 595. The user can add, update, apply, configure, and/or customize one or more domain or subject specific forms (e.g. deals, purchase details etc.), interfaces, controls, wizards and parameters, and the user can apply privacy settings & presentation settings including present one or more attachments or forms, interfaces, controls and/or, wizards to a user after capturing media and before executing functions 593, so that the user can input or provide contextual details or take one or more user-contextual actions. The user can add new, update or save existing, remove, share, apply privacy settings, presentation settings, and/or preferences, auto-generate one or more created or selected group(s), the user can schedule a trigger or presentation of these groups, including associated-input icons or labels. The user can also apply settings for dynamically presenting these groups based on a particular date & time, ranges of date & time, location, check-in place, activities, actions, interactions, events, transactions, user profile, user data, and/or connected users profiles and data 598.

A user can also apply settings including auto-add date/time, location, check-in place, profile data or profile link, system data, and/or metadata with one or more input icons or labels. The user can apply settings for a selected user for input icon(s) or label(s) associated with updating of settings, associate functions, and/or configurations before executing of functions. The user can also apply settings to present only a specific input label or present icon with labels. The user can apply settings for enabling voice commands indulging present input labels based on voice commands, for example, Movie—R-mall (1) Viewing movie (2) shopping at <shop name at R-mall> (3) Food <Ice-cream-brand> etc.

FIG. 6 illustrates various types of example main functions and additional functions. User can search, match, select, sort, order, rank, filter, install, uninstall, purchase, make payment, subscribe, add, add or update with existing functions, attach, detach, remove, invoke, activate, execute, upgrade, update, and/or present functions associated with one or more or set or categories or group of input icon and/or label.

Figure 7:
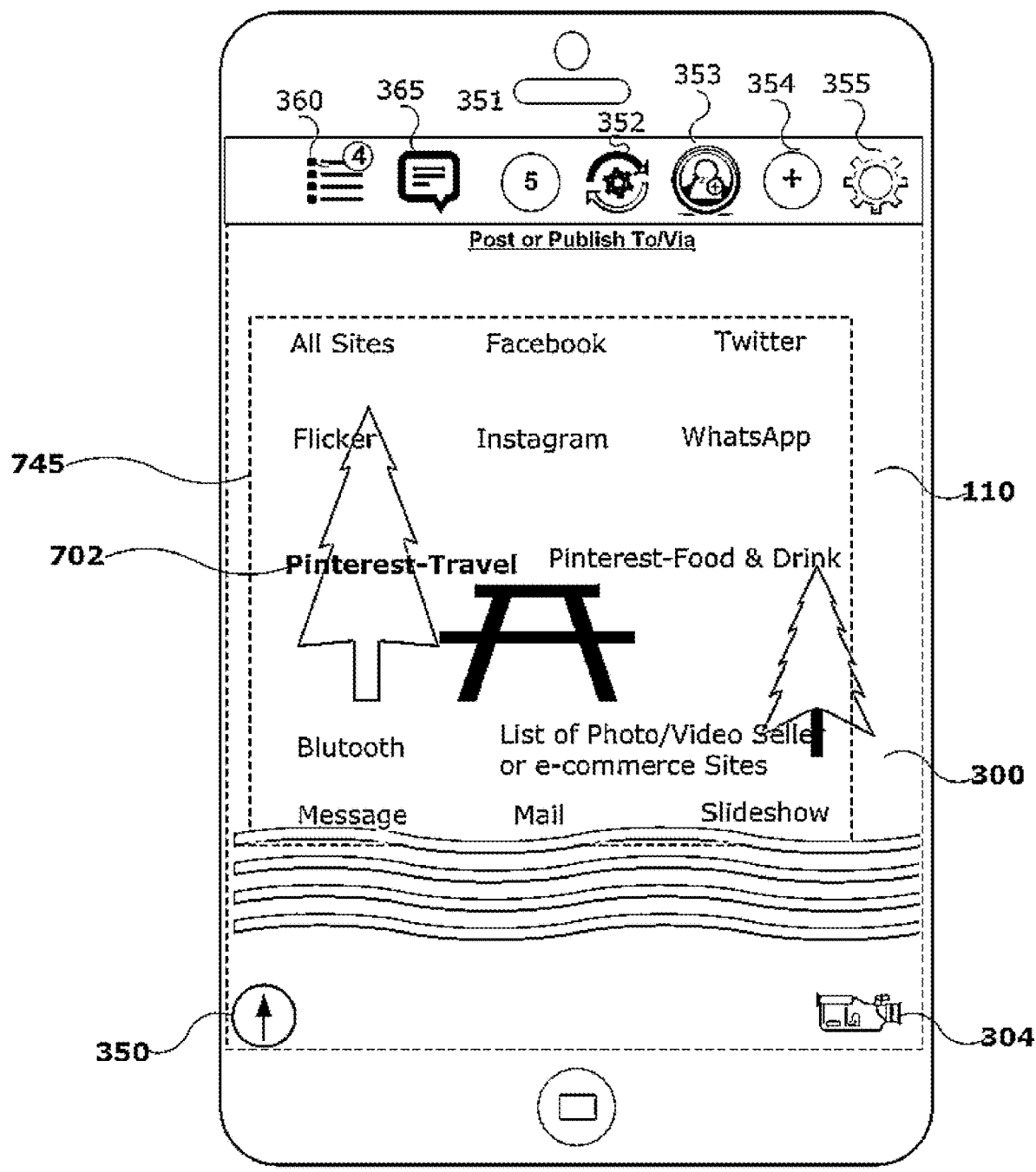
FIG. 7 is an illustration of an example embodiment graphical user interface on a single-mode visual media device.

FIG. 7 illustrates an example embodiment where a user clicks on "Post or Publish To/Via" option 353 and is presented with a group related set of input labels 745 on display 110 including "All Sites", "Facebook", "Twitter", "Flicker", "Instagram", "WhatsApp", "Pinterest-Travel", "Pinterest-Food & Drink", "Bluetooth", "List of Photo/Video Seller or e-commerce Sites", "Message", "Mail", and "Slideshow." The user is able to single-tap to capture a photo or double-tap to start capturing of video or press-and-hold to select one or more labels. The user can single-tap on any select sign associated labels to capture a photo or double-tap on any select sign associated labels to start capturing of video (see FIG. 13). For example, when the user single-taps on label "Pinterest-Travel" 702, then a photo is captured and the label associates with the "Post To < >" function and parameters of the web site address, login information, and category, enabling the user to post the photo to "Travel" category of www.pinterest.com.

Figure 8:
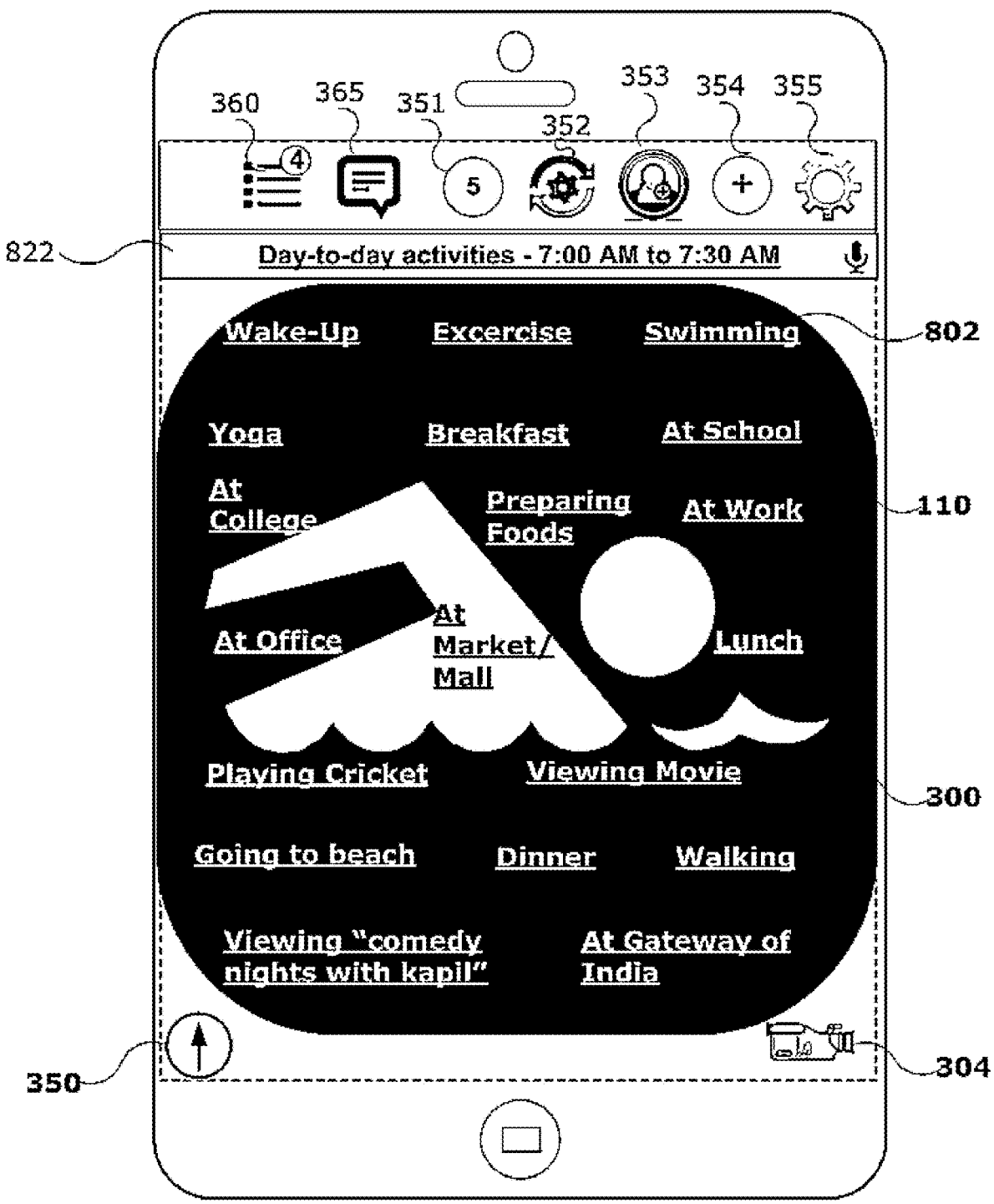
FIG. 8 is an illustration of another example embodiment graphical user interface on a single-mode visual media device.

FIG. 8 illustrates an example of a user customizing or creating a day to day activities group of labels 376 via interface 110, wherein each label under a group has default settings, including post capture photo to family and best friends, save at user's as well as at receiver's device, and wherein each label associates with particular activity name (e.g. FIG. 8 shows various types of activities for throughout the day or at only a particular date & time range such as 7:00 AM to 10 AM) and associates with a date & time range, so that the user may understand the type or category of photo or video needed to capture and share with specific contacts, including family and/or best friends. For example, at 7:00 AM-7:30 AM, the user is notified about or highlights the label "Swimming" based on previously-set settings, and the user or another user on their behalf double-taps on the "Swimming" label to capture video via icon 304 (as described in FIG. 3). The system stores captured video and executes said label "Swimming" associated functions, including posting the video, audio of video, and/or voice of the user to pre-set contacts, including family and/or best friends. As per the pre-settings, after capturing, storing, and sharing, the user is presented with a chat interface described in connection with FIG. 9.

Figure 9:
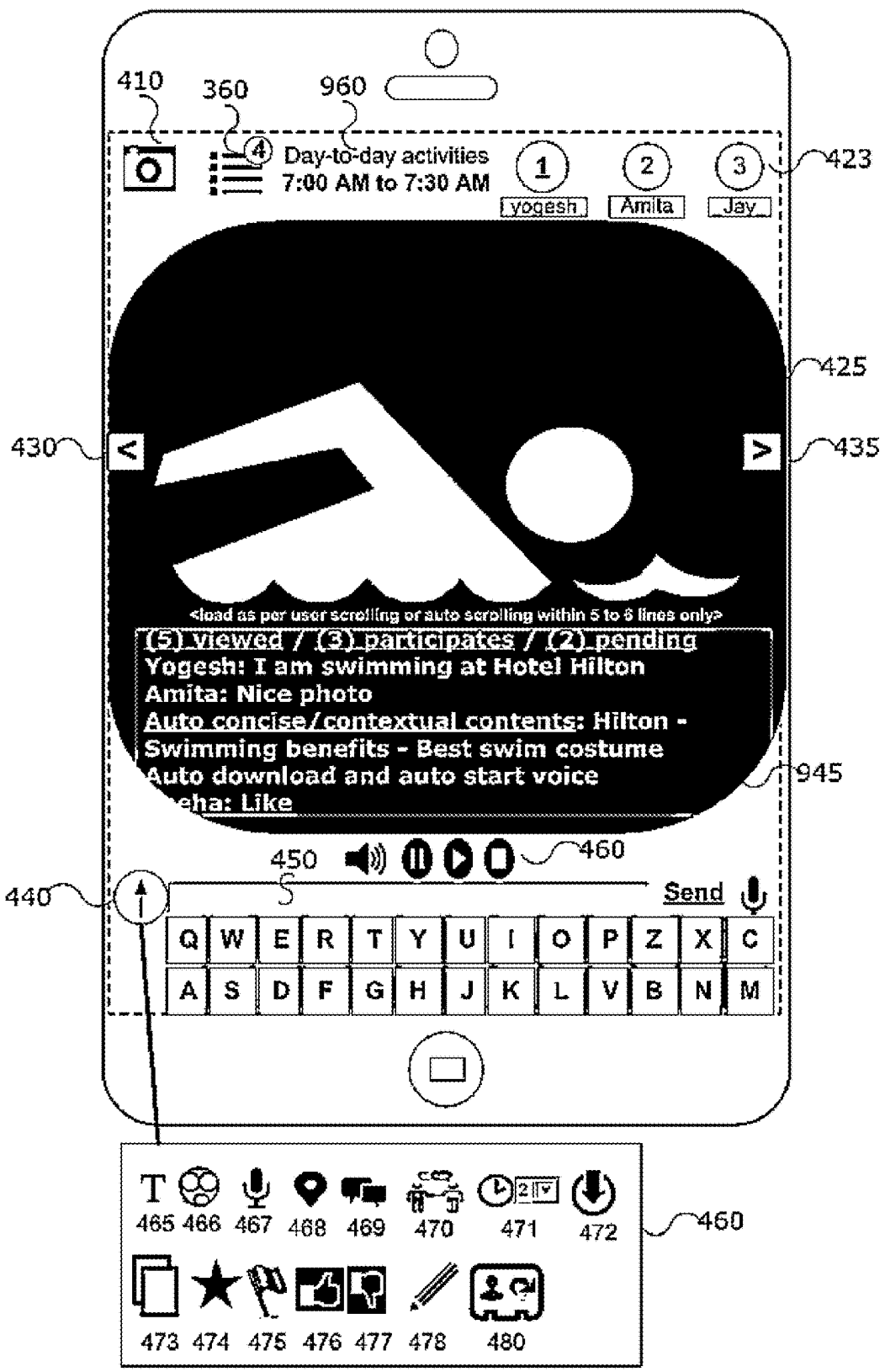
FIG. 9 is an illustration of an example embodiment graphical user interface for enabling sender and/or receiver communications on shared media on a single-mode visual media device.

FIG. 9 illustrates an example embodiment where a user can view their own as well as other related users' 423 shared contents or media related to a same time-range-related-activity-specific shared contents, so the user can compare their activity with other users at that same time. In this way a user may perceive what they as well as what other users were doing or are doing or near-future plans. The user can send and/or receive one or more messages, voice messages, emoticons, location information, like, rating, comments, and/or reviews 945 from/to one or more related users 423. The user may be dynamically updated or presented with labels about updates by date & time, specific time slot, location, holiday, daily activities, past possible activities, a pre-selected daily generalized template of possible activities, and/or by a user and connected or added users' profile and user data.

Figure 10:
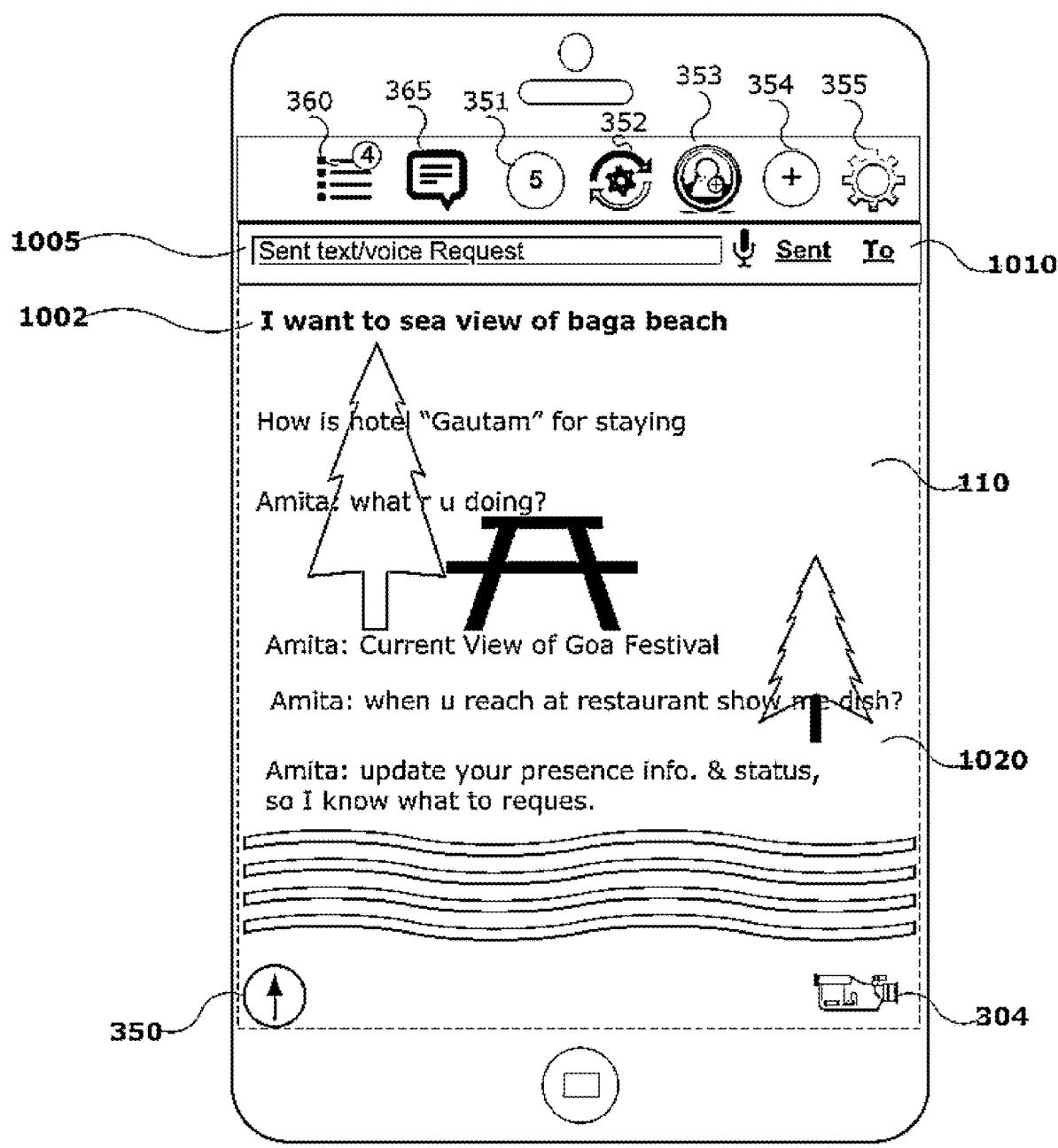
FIG. 10 is an illustration of another example embodiment graphical user interface on a single-mode visual media device.

FIG. 10 illustrates an example embodiment where the user can send request(s) 1005 to pre-set, default users, to a system default, or to selected types of other users of network(s), including contextual users, one or more contacts or group(s) of contacts, followers, following users, similar interest groups, one or user devices of a network(s) based on their location, presence information, check-in place(s), availability status, updates, profile data, and/or user data for requesting live or near-live sharing or broadcasting of media, including video, audio, voice, images, photos, and/or text. The user can receive contextual requests 1002 from other users of the network(s) on display 110, so the user can, in real-time, be notified about and view new requests 1002 in chronological or any other preferred order. The user can directly one-tap or double-tap on request 1002 to start real-time capturing, recording, broadcasting, and/or sharing of captured media or contents to a requesting user(s). In the absence of internet or network connectivity, captured media may be saved to local storage and later sent to the requesting user(s) when connectivity available. Similarly, the requestor may receive and/or view the requested media when internet or network connectivity becomes available. For example, if a user is wondering at Baga Beach and, based on that location, the user receives, is presented with, and/or is notified of other users' requests 1002 related to "Baga Beach" (e.g. "I want to sea view of Baga Beach"), the user can immediately one-tap or double-tap on request 002 to start capturing video, audio, photos, and/or voice comments related to "sea view of Baga Beach" to share with the requestor or one or more similar request(s).

Figure 11:
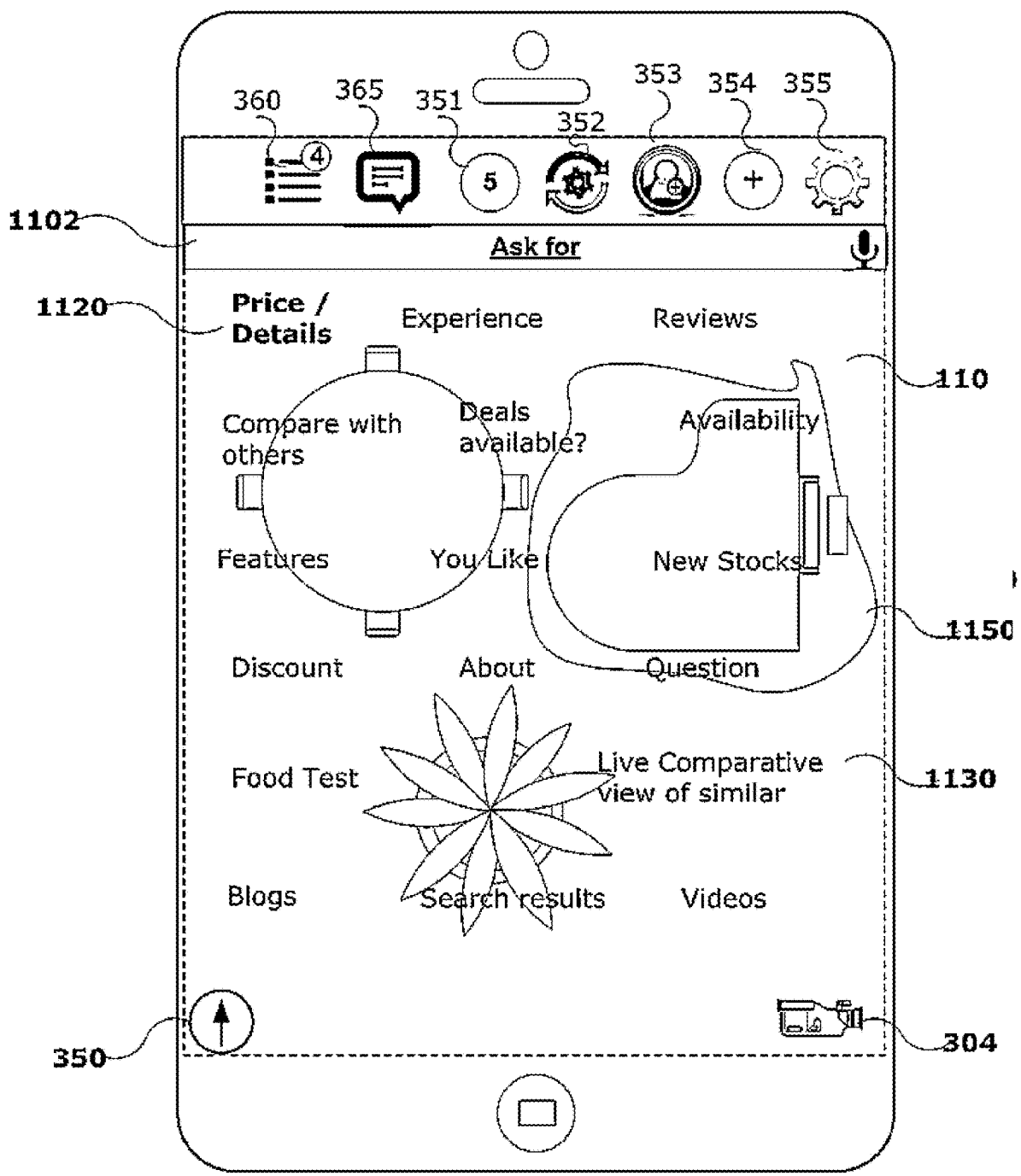
FIG. 11 is an illustration of another example embodiment graphical user interface on a single-mode visual media device.

FIG. 11 is an illustration of an example embodiment graphical user interface. As seen in FIG. 11, a user may click, single-touch, single-tap, etc. on input label "Price" 1120 for capturing photo 1130 of, for example, products displayed at a shop or mall. For example, the user may ask a price and details to other contextual users for the products via free form line 1150 inside the captured photo 1130. The user may then receive price or other details of the highlighted products from a particular seller on display 110 of user's device.

Figure 12:
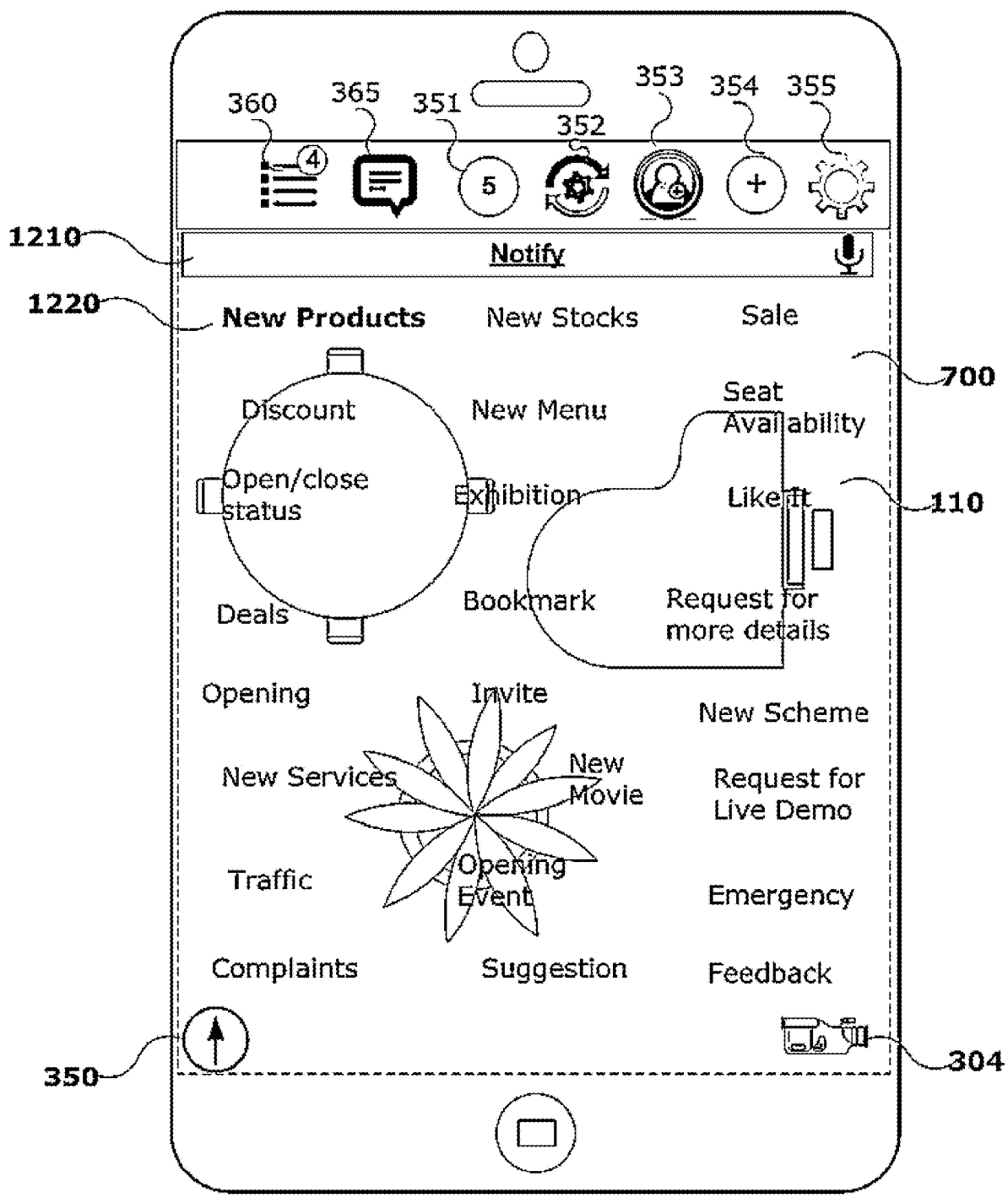
FIG. 12 is an illustration of another example embodiment graphical user interface on a single-mode visual media device.

FIG. 12 is an illustration of an example embodiment graphical user interface where the user may click, single-touch, or single-tap on input label "New Products" 1220 for capturing photo 1130 of new products displayed on at a shop. The user may notify a pre-set list of customers about the newly-arrived products. The user can send or attach other contents with the photo or video including catalog, information about products, and like.

Figure 13:
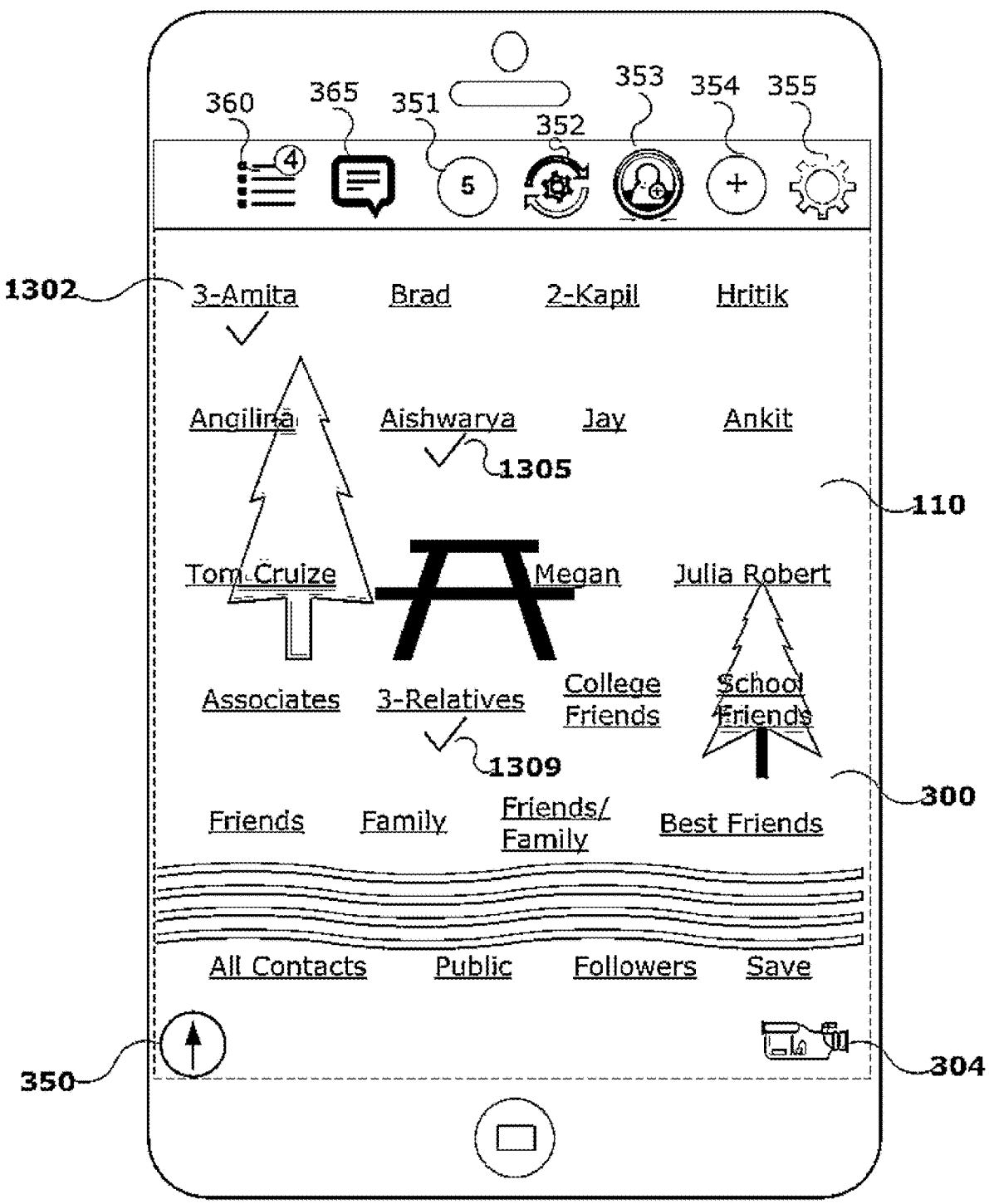
FIG. 13 is an illustration of another example embodiment graphical user interface on a single-mode visual media device.

FIG. 13 illustrates another example embodiment where a user can select one or more input labels from set 1302, 1305, and 1309, via a long press, press-and-hold, or any other types of touches and release. When the user releases the touched labels, they are highlighted with particular icon (e.g. "right sign" icon) in association with selected input labels 1302, 1305, and 1309. Or, for example, labels 102, 1305, and 1309 may be highlighted in bold or given an alerting color so that the user can single-tap, double-tap, or otherwise engage any selected labels to capture video or photo for sending, sharing, and/or broadcasting to the label associated with one or more users, contacts, group(s), sources, destinations, and like.

Figure 14:
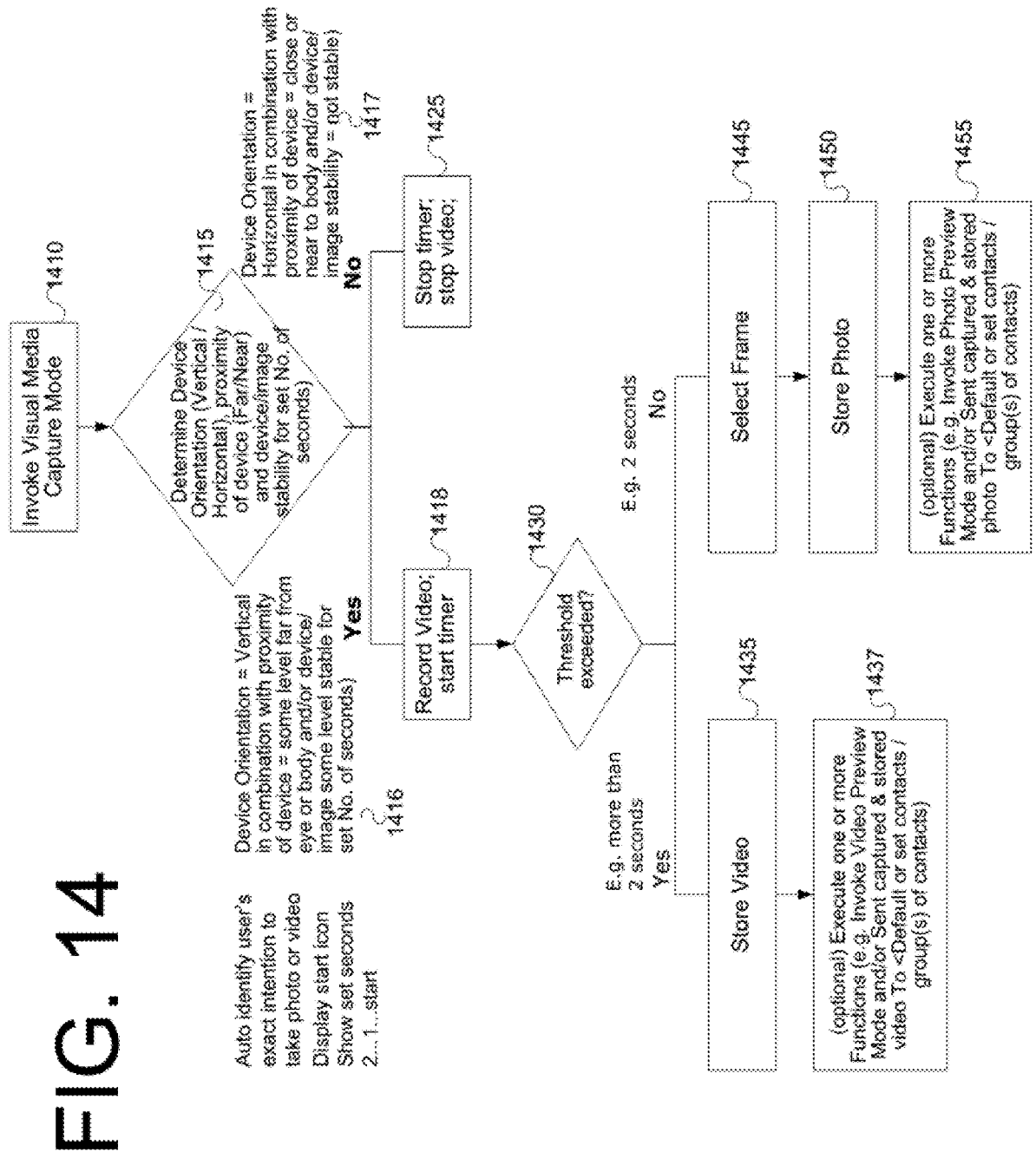
FIG. 14 is a flow chart illustrating implementation actions for auto- and single-mode visual media capture.

FIG. 14 illustrates an example method of hands-free or auto-capture recording of photo or video & voice. From FIG. 1, the processing operations of FIG. 14 may be associated with auto visual media capture controller 138. As seen in FIG. 14, an auto visual media capture mode is invoked 1410. For example, a user may access an application presented on display 110 to invoke an auto visual media capture mode. For example, display 110 (FIG. 3) may be in an auto visual media capture mode while presenting visual media 300. Display 110 may also presents an auto mode input icon 333.

Orientation of device (e.g. vertical) may be determined in combination with proximity of device (e.g. some level far from eye or body), stability level of device or display image (e.g. some level device and/or image stability for particular set period of time (e.g. number of seconds), and/or amount of time user holds device in particular orientation (e.g. vertical orientation) to determine whether a photograph will be recorded or a video. For example, if a user initially intends to take a photograph, then the user may invoke auto visual media capture mode and keep device in a vertical position, as detected by a sensor. A proximity sensor may further determine that the device is far from a subject's body or eye, and device stability may be detected based on a compass, accelerometer, gyroscope, or other sensors, such that the system determines a photo is to be captured, based on all this sensor data.

Once photo capturing initiates, if the user decides that the visual media should instead be a video, the user may continue to keep device in vertical position. If the orientation of device is vertical persists for a specified period of time (e.g., 3 seconds), then the output of the visual media capture is determined to be video. The video mode may be indicated on the display 110 with an icon 304. Thus, a single gesture allows the user to seamlessly transition from a photograph mode to a video mode and therefore control the media output during the recording process. This is accomplished without entering one mode or another prior to the capture sequence.

Returning to FIG. 14, sensor data is identified 1415; for example, sensor(s) 190 generates signals data for processing by the auto visual media capture controller 138 in conjunction with the processor 130, seen in FIG. 1. In 1415, video is recorded and a timer is started in response to sensor data. The video may be recorded by processor 130 operating in conjunction with memory 136 in FIG. 1. Alternately, a still frame may be taken from the video feed and stored as a photograph in response to detection 1416 of device orientation as vertical, in combination with proximity being determined as equal to slightly farther from a body or eye of the subject and device stability. A timer may be set by processor 130 under the control of the auto visual media capture controller 138. Video may continue to record on the display 110, and the timer may continue to run in response to detection of vertical orientation of device in combination with proximity data and/or device stability related data from one or more sensors.

A horizontal orientation is subsequently identified 1417. In 1425, the timer is stopped as well as recording of video. The elapsed time recorded by the timer is then evaluated by the auto visual media capture controller 138 against a specified threshold (e.g., 3 seconds) in 1430. If the threshold is exceeded (1430—Yes), then the video is stored 1435. For example, the video may be sent to the video library controller 160 for handling. The auto visual media capture controller 138 may include executable instructions to prompt the video library controller to execute one or more default, auto-identified, selected, user-applied, or custom functions (e.g. send to one or more selected contacts/group(s) or publish to one or more web sites and/or enter a video preview mode) 1437.

If the threshold is not exceeded (1430—No), a frame of video is selected 1445 and is stored as a photograph 1450. As indicated above, an alternate approach is to capture a still frame from the camera video feed as a photograph upon detection of orientation of device (e.g. vertical) in combination with proximity of device (e.g. some level far from eye or body) and/or stability level of device or display image (e.g. image unchanged for particular set period of time). The photograph may then passed to the photographic library controller 150 for storage. In 1455, visual media capture controller 138 may then execute one or more default, auto-identified, selected, user-applied, and/or custom functions (e.g. send to one or more selected contacts/group(s) or publish to one or more web sites and/or enter a photo preview mode).

A single recording mode allows detection of device orientation, proximity of device to subject, and device/image stability to determine whether a photograph or a video is captured and/or stored. Thus, a single recording mode allows one to seamlessly transition between photograph and video recording. For example, a photograph may be taken upon device orientation detection in combination with proximity of device to subject eye or body and/or stability level of the device or displayed image, potentially over a period of time. Or, for example, if device orientation is detected in combination with proximity of device and a stability level of the device or displayed image persists for a threshold period, then video is recorded. The device may record both a photograph and video in the threshold is exceeded or conditions otherwise transition from photograph to video, and the user may then access both the photograph and the video.

Device orientation, such as vertical, horizontal, or some angle and stability of device/image may identified via sensors like a compass, gyroscope, accelerometer, and/or gesture sensors. Device proximity to a captured subject may be detected via a proximity sensor that detects a distance from device to subject. A compass, gyroscope, accelerometer, and/or gesture sensor(s) can be used to detect orientation and direction of the device.

The user may also use voice commands to instruct the device to capture photo, start video, audio, and/or voice, to stop or end recording of media, preview media, save media, add to a story, photo, or video, enable or disable voice or audio with media, share with or send to one or more contacts, group(s) of contacts, sources, or destinations, set a number of seconds to auto-remove the media, etc.

By using or invoking visual media capture mode 1410, the user can capture or record photo, video, audio, and/or voice completely hands free or without touching a display of the device. This may allow the user to fully concentrate on capturing the media. Frames captured by a change in orientation or other command intended to stop a video or photo, such as a user turning the device 90-degrees or issuing a vocal stop command, may be removed from stored media 1435. The user may also enable or disable a photo and/or video preview mode.

Several options are also available to users. Based on settings provided by a sender to remove a shared photo or video from receiver's device after set time (e.g. auto-remove photo after 3 seconds or video up-to length of video), the media may be removed. The user may manually or automatically select one or more functions for said auto captured or stored photo(s) and/or video(s) and/or voice. The user may further set a delay period of time after which photos or videos will be automatically published or shared. The user may also set a delay period for automatic execution or disabling of functions or select when one or more function(s) and associate parameters (e.g. change pre-selected contacts as recipients for sending captured photo or video) applies to captured media. Users may pre-set one or more of these selected functions to be applied upon auto-capturing or recording media. For example, a user may select a function "Auto Sent To" and select associated parameters including one or more contacts or group(s) of contacts (e.g. Friends & Family group(s) of contacts) and applied to auto-captured media. In such an example, when a user captures media in auto mode, then the pre-set function(s) automatically execute upon media capture (e.g., send auto-captured photo or video or voice to the pre-selected Friends & Family group).

Auto Visual Media Capture Mode 1410 can be enabled or disabled via shaking of the device, as sensed by one or more types of sensors such as a compass, gyroscope, accelerometer, and/or gesture sensors. A dedicated device can auto-open the display for the camera and invoke the visual media capture mode or auto visual media capture controller application 1410. Or, for example, an electronic device including digital image sensors to capture visual media, a display to present the visual media from the digital image sensors, a sensor(s) including a gyroscope, accelerometer, proximity sensor, compass, and/or audio or gesture sensors to identify device/image orientation, proximity, and stability on the display, and an auto visual media capture controller to alternate between photograph or video based upon orientation, proximity, device/image stability and changes therein.

The visual media capture controller may identify, monitor, track, record, recognize, detect, determine, and/or sense device/image orientation, stability, and/or proximity data from sensors including a gyroscope, accelerometer, proximity sensor, compass, audio or gesture sensors. The visual media capture controller may selectively store the photograph/video in storage and/or invoke a photograph/video preview mode. The auto visual media capture controller may select a frame or image of the video to form or extract the photograph. The auto visual media capture controller may store the photograph upon change in orientation of device/image. The auto visual media capture controller may be so configured via instructions executed by a processor, and may additionally be connected to a wireless signal processor, a power control circuit, and/or a global positioning processor connected to the processor.

Some example methods being described here and in the incorporated documents, it is understood that one or more example methods may be used in combination and/or repetitively to produce multiple options and functionalities for subscribers. Example methods may be performed by properly programming or hardware configuring notification networks to receive healthcare information and subscriber information and act in accordance with example methods. Similarly, example methods may be embodied on non-transitory computer-readable media that directly instruct computer processors to execute example methods and/or, through installation in persistent memory, configure general-purpose computers connected to subscribers and healthcare information sources into specific healthcare notification networks that execute example methods.

Example methods and embodiments thus being described, it will be appreciated by one skilled in the art that example embodiments may be varied through routine experimentation and without further inventive activity. For example, although compared healthcare information used to determine a readmission is shown as originating from two independent healthcare providers having it is understood that a readmission may be determined and alert issued from healthcare information all received from a same, commonly-controlled provider. Variations are not to be regarded as departure from the spirit and scope of the exemplary embodiments, and all such modifications as would be obvious to one skilled in the art are intended to be included within the scope of the following claims.

What is claimed is:

1. A computer program product comprising a non-transitory computer-readable medium having instructions encoded thereon that, when executed by a processor, cause the processor to:

present a user interface to a user of a client device, wherein the user interface includes,
  a plurality of icons, and
  visual data representing a view currently viewed by a video recording device, wherein the plurality of icons and the visual data are displayed simultaneously, wherein the plurality of displayed icons visually appear overlapping the visual data such that the user of the client device can view both the displayed icons and the visual data, wherein the plurality of displayed icons are associated with one or more types of destinations to which the visual data can be sent;

receive only a single user action from the user of the client device selecting one of the plurality of displayed icons, wherein the single user action is touching and holding the selected icon on a touch screen for a threshold period of time; and responsive to the single user action and not based on any subsequent input from the user of the client device,
  capture the visual data from the video recording device during the threshold period of time, wherein the captured visual data is a video clip representing images taken over time, and wherein the video clip is taken over a window of time corresponding to the touching and holding the selected icon, and
  send, to one or more types of one or more contacts and destinations associated with the selected icon, the captured visual data.

2. A system, comprising:
a video recording device; and
one or more processors communicatively coupled to a network, wherein the one or more processors are configured to,
present a user interface to a user of a client device, wherein the user interface includes,
  a plurality of icons, and
  visual data representing a view currently viewed by a video recording device, wherein the plurality of icons and the visual data are displayed simultaneously, wherein the plurality of displayed icons visually appear overlapping the visual data such that the user of the client device can view both the displayed icons and the visual data, wherein the plurality of displayed icons are associated with one or more types of destinations to which the visual data can be sent;

receive only a single user action from the user of the client device selecting one of the plurality of displayed icons, wherein the single user action is touching and holding the selected icon on a touch screen for a threshold period of time; and responsive to the single user action and not based on any subsequent input from the user of the client device, capture the visual data from the video recording device during the threshold period of time, wherein the captured visual data is a video clip representing images taken over time, and wherein the video clip is taken over a window of time corresponding to the touching and holding the selected icon, and send, to one or more types of one or more contacts and destination associated with the selected icon, the captured visual data.

* * * * *